United States Patent [19]

Albanesi et al.

[11] Patent Number: 4,698,215

[45] Date of Patent: Oct. 6, 1987

[54] STABILIZED RED PHOSPHORUS FOR USE AS FLAME-RETARDANT, IN PARTICULAR FOR COMPOSITIONS ON THE BASIS OF POLYMERS

[75] Inventors: Giancarlo Albanesi, Milan; Gianfranco Rinaldi, Magenta, both of Italy

[73] Assignee: Saffa S.p.A., Milan, Italy

[21] Appl. No.: 813,924

[22] Filed: Dec. 27, 1985

[30] Foreign Application Priority Data

Mar. 19, 1985 [IT] Italy .................. 19962 A/85

[51] Int. Cl.$^4$ .................. C01B 25/023; C09K 21/00; C08K 9/10
[52] U.S. Cl. .................. 423/274; 252/400.1; 252/400.2; 252/404; 252/405; 252/601; 252/609; 423/265; 423/322; 523/205; 523/200; 524/80; 524/414; 427/221; 428/403
[58] Field of Search .................. 252/609, 604, 601, 610, 252/404–405, 400.2, 400.1; 423/322, 265–266, 274; 523/200, 205; 524/80, 414; 427/221; 428/403

[56] References Cited

U.S. PATENT DOCUMENTS

| | | | |
|---|---|---|---|
| 3,644,595 | 2/1972 | Wu | 252/609 |
| 3,808,127 | 4/1974 | Sander et al. | 252/609 |
| 4,210,630 | 7/1980 | Dany et al. | 423/265 |
| 4,315,897 | 2/1982 | Staendeke et al. | 423/322 |
| 4,440,880 | 4/1984 | Albanesi et al. | 523/205 |
| 4,550,133 | 10/1985 | Nielinger et al. | 252/609 |

FOREIGN PATENT DOCUMENTS 2000033  1/1970  Fed. Rep. of Germany ...... 252/609

Primary Examiner—Stephen J. Lechert, Jr.
Assistant Examiner—Howard J. Locker
Attorney, Agent, or Firm—Collard, Roe & Galgano

[57] ABSTRACT

Stabilized powder of red phosphorus, for use as flame-retardant agent, in particular for compositions on the basis of polymers, constituted by particles of red phosphorus enveloped by a thin capsule constituted by a first layer of Al(OH)$_3$ adhering on to the surface of red phosphorus individual particles, and by a second layer, superimposed onto said first layer, constituted by a cross-linked polyconsensation resin formed by urea-melamine-phenol-formaldehyde.

5 Claims, No Drawings

STABILIZED RED PHOSPHORUS FOR USE AS FLAME-RETARDANT, IN PARTICULAR FOR COMPOSITIONS ON THE BASIS OF POLYMERS

FIELD OF THE INVENTION

The invention relates to stabilized powder of red phosphorus for use as flame-retardant, in particular for compositions on the basis of polymers, and to a process for the preparation thereof.

DESCRIPTION OF THE PRIOR ART

The use of red phosphorus (hereinunder also indicated as "red-P") as flame-retardant agent, in particular for materials on the basis of polymers, is known and protected by several Patents, red-P being a very good fire-proofing agent, and having the advantage of not disturbing to a significant extent the physical-mechanical characteristics of polymers into which it is incorporated.

It is however known that powder of red-P, per se creates, during the operations for its handling and use, considerable problems of environmental hygiene, of safety, and processing problems (equipment corrosion). Specifically in the presence of air and steam, red-P undergoes oxidation and disproportioning reactions leading to the formation of phosphine (notoriously very toxic, irritant and spontaneously flammable) and of various oxygen-containing acids phosphorus. Such acids, particularly cause corrosion of machinery for the processing of plastic materials incorporating red-P (injection moulding, extrusion and the like). The various oxygen-containing acids of phosphorus also result in undesired alterations in plastics incorporating red-P with respect to various chemical-physical characteristics, particularly, electrical characteristics. To overcome the aforesaid drawbacks with respect to the use of red-P as a flame-retardant agent, various methods have been proposed to "stabilize" it (in particular by encapsulating and/or blending it by/with various synthetic resins and/or compounds, in particular oxides, of metals). These methods noticeably reduce, even if not always in a completely satisfactory way, the formation of phosphine and of phosphorus oxygen-containing acids.

U.S. Pat. No. 4,440,880 discloses how to stabilize powder of red-P by encapsulating the individual particles thereof with a cationized modified melamine resin. This resin is a polycondensation product of melamine, formaldehyde, triethanolamine and methanol. When so encapsulated red-P powder is stabilized, and can be advantageously used as is flame-retardant for various compositions on the basis of polymers.

German Pat. DE No. 2623112 teaches how to stabilize powder of red-P by encapsulating the particles thereof with a protective layer of aluminium hydroxide. These methods are not very satisfactory in that, to have useful stabilizing effects, large amounts of aluminium hydroxide must be used. This method is undesirable in that substantial modifications occur in the characteristics of the products into which the same is incorporated.

For purpose of improving the stabilizing effects of aluminium hydroxide for red-P, it is possible to associate the aluminum hydroxide with metal hydroxide, for example lead hydroxide, as an oxidation stabilizer (U.S. Pat. No. 4,210,630). Moreover, to further increase the red-P stability, enveloping has been proposed, in U.S. Pat. No. 4,315,897, by providing red-P powder particles with a thin layer of an oxidation stabilizer constituted by a combination of aluminium hydroxide and of an epoxy resin.

The foregoing evidences continuous efforts by those skilled in the art to device improved solutions toward achieving an optimum stabilization of red-P for the purpose of making its use as a flame-retardant agent more efficacious and safe.

SUMMARY OF THE INVENTION

By the present invention it has now been surprisingly found that the stabilization of powder of red-P can be substantially improved, over the prior art, by coating red-P powder particles with a twofold coating, constituted by aluminium hydroxide, and by a urea-melamine-phenol-formaldehyde resin.

More particularly, stabilized powder of red-P according to the present invention is constituted by red-P particles, having sizes less than 200 $\mu$m, preferably of about 10–40 $\mu$m. Individually enveloped inside a capsule of antioxidizer material, which capsule is constituted by a first layer of Al(OH)$_3$ adhering to the surface of red-P individual particles, and by a second layer, superimposed to said first layer, constituted by a polycondensation resin constituted by urea, melamine, phenol, and formaldehyde. The inventive capsule representing an amount by weight, relative to the red-P enveloped by the same capsule, of 1–12% (preferably of 2.5–5.5%), said Al(OH)$_3$ and said resin being present in amounts by weight, each one relative to red-P, respectively of 0.2–4% (preferably of 0.5–1.5%), and of 0.8–8.0% (preferably of 2–4%).

DETAILED DISCLOSURE OF THE INVENTION

The preferred urea-melamine-phenol-formaldehyde resin is, according to the invention, the resin "SELOFORM MUF 63" manufactured by the firm "CHIMICA POMPONESCO S.p.A." of Pomponesco (province of Mantua, Italy).

The preferred, but not the exclusive process for encapsulating red-P powder by the twofold antioxidizer layer as above mentioned includes, according to the present invention, forming a composition constituted by water comprising, homogeneously dispersed, a red-P powder and, dissolved, aluminium sulfate. The composition is adjusted, under stirring, to a pH value of approximately 8–9, so that Al(OH)$_3$ precipitates on the individual particles of said red-P powder. The red-P powder, so encapsulated with Al(OH)$_3$, is separated from the alkaline mother liquors and then redispersed in water, into which also ammonium chloride and a pre-condensed resin, formed by urea-melamine-phenol-formaldehyde resin, are dissolved. The resin is then made precipitate and crosslinked, on the pre-encapsulated red-P particles, by increasing the temperature of the obtained composition up to about 90°–100° C.; and finally separating from said composition, by drying, red-P particles, which are encapsulated with a first layer of Al(OH)$_3$, and with a second layer of resin. More particularly, said process includes the following stages:

(a) preparing a dispersion in water of approximately 40% of red-P powder and adding a solution in water of about 10%, by weight of Al$_2$(SO$_4$)$_3$ 18H$_2$O to the dispersion. The ratio, by weight, of red-P:Al$_2$(SO$_4$)$_3$ 8H$_2$O being from 10:1 to 70:1, with 50:1 the preferred ratio;

(b) homogenizing the components as under (a) and adjusting the mixture's pH at a value of about 8 by an alkaline means, preferably an aqueous solution of about 10% by weight of $Na_2CO_3$, or of $NH_4OH$, thus causing $Al(OH)_3$ to precipitate on to red-P particles;

(c) separating (by filtering or the like) the red-P thus encapsulated by $Al(OH)_3$. This is followed by washing the red-P with water to remove any residuals of alkalinity, and, then redispersing in water said pre-encapsulated and washed red-P to form a dispersion thereof at about 40% by weight;

(d) adding to said dispersion, under stirring, an aqueous solution of about 65% by weight of a pre-condensed resin ("syrup") formed by urea-melamine-phenol-formaldehyde. This is followed by homogenizing the whole for about half an hour at a temperature of about 80° C. The resin being preferably represented by the resin "SELOFORM MUF 63" by the firm CHIMICA POMPONESCO S.p.A. of Pomponesco (province of Mantua, Italy). The resin is particularly water-resistant at high temperatures;

(e) adding to the composition, as obtained under (d), an aqueous solution of about 10% of $NH_4Cl$, said $NH_4Cl$ representing about 0.03–0.05% by weight of total solids;

(f) heating to 90°–100° C., under stirring, for about 3 hours, the composition as obtained under (e), thus the end encapsulating of red-P powder particles being accomplished [already pre-encapsulated, as mentioned above, by $Al(OH)_3$], with said resin crosslinked around the same particles during the heating stage;

(g) dehydrating, by vacuum drying at about 100° C. (without previous filtering), the encapsulated red-P powder suspension obtained in stage (f). The end powder of red-P encapsulated by a first layer of $Al(OH)_3$, adheres to the surface of red-P particles, and by a second layer (superimposed to said first layer) constituted by the above mentioned crosslinked resin is obtained.

The so encapsulated red-P powder which results in non-aggregating, free flowing and efficaciously stabilized for environments having high humidity and high temperature.

The present invention will now be described by reference to the following Examples. It should, however, be stressed that the following Examples are given as being illustrative of the present invention and not as a definition of the limits or scope of the invention.

In said Examples, the stability to oxidation is compared four four samples, constituted by the red-P powder, stabilized by encapsulation in four ways, namely:
red-P stabilized, according to the invention, with urea-melamine-phenol-formaldehyde resin only (Example 1);
red-P stabilized, according to the invention, with $Al(OH)_3$+urea-melamine-phenol-formaldehyde resin (Example 2);
red-P stabilized with $Al(OH)_3$+melamine resin, said resin (as according to U.S. Pat. No. 4 440 880) being substantially different from the one selected according to the present invention (Example 3);
red-P stabilized according to the known art, i.e., with $Al(OH)_3$+epoxy resin, according to U.S. Pat. No. 4 315 897 (Example 4).

Summarizing, Examples 3 and 4 are supplied for the purpose of comparing them with Example 2, in order to evidence the considerable technical progress offered by the present invention.

EXAMPLE 1

Encapsulation of red-P with resin (comparison)

Into a reaction vessel of 1000 ml in capacity, provided with magnetically-driven stirring means, and with electrical heating means, 250 g of powder of red-P in the form of an aqueous dispersion at 40% by weight, and 7.5 g of urea-melamine-phenol-formaldehyde resin in form of an aqueous solution at about 65% by weight are charged.

The red-P powder is constituted by particles with an average diameter of about 10–40 μm, and an iron content of 700 ppm (parts per million by weight). The is resin "SELOFORM MUF 63", supplied by the firm CHIMICA POMPONESCO S.p.A. of Pomponesco (province of Mantua, Italy).

The components are homogenized with each other under stirring at 80° C. over 30 minutes. Subsequently 0.1 g of ammonium chloride ($NH_4Cl$) in are added in the form of a solution in water at 10% by weight. The resulting mixture is then heated at 90°–100° C. under stirring over 3 hours, the encapsulating of the particles of red phosphorus powder with said resin crosslinked around the same particles during the heating stage being so accomplished. The dispersion of encapsulated red-P obtained is dried under thin layer conditions in an oven in vacuo (residual vacuum about 20 mmHg) at 100° C., a stabilized red-P powder being eventually obtained.

The stability to oxidation of red-P stabilized as hereinabove described (as well as red-P stabilized according to the following Examples) is determined according to "Test 1", as described in Example 1 of U.S. Pat. No. 4 315 897, and namely:

Four hundred fifty grams of water and 1 g of encapsulated red-P are introduced into a three-neck flask provided with a pipe for gas inlet. Using thermometer, with a refluxing condenser and with a magnetic stirrer: the mixture is heated to 80° C., and through it 10 liters/hour of oxygen are provided, under stirring. The gas mixture developing through the reflux condenser, consisting of oxygen and phosphine (produced together with oxygen-containing acids of phosphorus, by disproportioning of red phosphorus) is flowed through two scrubbing bottles, placed in series with each other, each one containing 100 ml of an aqueous solution of 2.5% by weight of mercuric chloride.

In this test, phosphine reacts with mercuric chloride according to the equation:

$$PH_3 + 3HgCl_2 \rightarrow P(HgCl)_3 + 3HCl$$

The amount of oxygen-containing acids of phosphorus contained in the aqueous suspension of red phosphorus, and hydrochloric acid contained in the two gas scrubbing bottles are employed as an index of red phosphorus' stability to oxidation. The contents of phosphoric acids and hydrochloric acid are determined by titration.

The values computated from said titrations are reported in Table 1, columns A and B. In column A, the amounts of $PH_3$ are reported (mg of $PH_3$ per phosphorus g per hour) formed during oxidation of red phosphorus. Values in column B are indexes of the acidity of the phosphorus containing aqueous solution, resulting from the formation of phosphorus acids during the oxidation of red phosphorus (mg of KOH per phosphorus g per hour).

EXAMPLE 2

In the equipment of Example 1, 250 g of powder of red-P (identical to that of Example 1) are charged, as an aqueous dispersion at 40% by weight, as well as 10 g of $Al_2(SO_4)_3 \cdot 18H_2O$, as an aqueous solution of 10% by weight.

Under stirring, and at room temperature, the pH value of the above mixture is adjusted to 8 by means of an aqueous solution of 10% by weight of $Na_2CO_3$, causing $Al(OH)_3$ to precipitate on to the red-P particles. Red-P so "pre-encapsulated" by the layer of $Al(OH)_3$ is filtered off, and washed with water to remove alkalinity. The red-P is then dispersed in water to obtain a dispersion of 40% of said pre-encapsulated red-P; after that, the process is carried out exactly as in Example 1 (encapsulating of red-P with resin). Are in this case particles of red-P being obtained coated, according to the invention, by a capsule constituted by a first layer of $Al(OH)_3$ adhering to the surface of individual particles of red-P and by a second layer (superimposed to the first one) constituted by the crosslinked resin formed by urea-melamine-phenol-formaldehyde.

In Table 1 the results of stability test are reported.

EXAMPLE 3

The process is carried out as in Example 2 up to the obtaining of an aqueous dispersion at 40% of red-P which is already pre-encapsulated with $Al(OH)_3$. The pre-encapsulated red-P being then encapsulated with the cationized-modified melamine resin as described (as for compositions and production modalities) in Example 1 in U.S. Pat. No. 4,440,880, using 17.3 ml of said resin.

The data relating to the encapsulated red-P so obtained, and related stability to oxidation are reported in Table 1.

EXAMPLE 4

With the same equipment as Example 1, 250 g of powder of red-P (identical to that of Example 1) as an aqueous dispersion of 30% by weight are charged.

Said suspension is treated with 2.5 g of $Al_2(SO_4)_3 \cdot 18H_2O$, 0.5 g of Beckopox EP 128 (epoxy resin by Hoechst A. G. of Frankfurt am Main, FRG) and 0.5 g of Beckopox VEH 2130 (aliphatic polyamine by Hoechst A. G., of Frankfurt am Main, FRG). By crosslinking said epoxy resin according to the modalities as described in Example 1 of U.S. Pat. No. 4 315 897. Eventually, a red-P stabilized according to said Patent is obtained. The data for this composition and stability are reported in Table 1.

From the data appearing in Table 1, the stability of oxidation of red-P encapsulated according to the present invention is surprisingly better than of red-P encapsulated according to the prior art.

Still better results, according to the invention, are obtained when, to practically embody the same invention, a red-P powder with a low iron content is selected. In fact, by repeating Example 2 with the only difference that, instead of red-P containing 700 ppm of iron as in said Example, red-P with an iron concentration of only 160 ppm is used, the following data are obtained in stability test:

A-(mg of $PH_3$/g $\times$ hour): $1.20 \times 10^{-2}$ instead of $1.27 \times 10^{-2}$ as in Example 2

B-(mg of KOH/g $\times$ hour): 0.50 instead of 1.49 as in Example 2.

The advantage of selecting red-P powder with a low iron content, at least lower than 180 ppm, hence evident.

If Example 2 is repeated a plurality of times, simply varying the amount of aluminium sulfate and of resin, so that the stabilizer capsule contains amounts (by weight relatively to red-P) ranging from 1 to 12. The $Al(OH)_3$ and the resin are present in amounts (by weight, each relative to red-P) ranging, respectively, from 0.2 to 4% and from 0.8 to 8%. No meaningful variations in stability of red-P stabilized according to the invention are observed.

While only several embodiments of the present invention have been shown and described, it will be obvious to those skilled in the art, that many modifications may be made thereunto without departing from the spirit and scope of the invention.

TABLE 1

| Example | Stabilizers (% by weight relatively to red phosphorus) | | A (mg of $PH_3$/g $\times$ hour) | B (mg of KOH/g $\times$ hour) |
| --- | --- | --- | --- | --- |
| 1 | Resin SELOFORM MUF | 3% | $4.68 \times 10^{-2}$ | 14.24 |
| 2 (according to the invention) | Resin SELOFORM MUF + $Al(OH)_3$ | 3% 1% | $1.27 \times 10^{-2}$ | 1.49 |
| 3 | Melamine resin + $Al(OH)_3$ | 3% 1% | $3.80 \times 10^{-2}$ | 2.20 |
| 4 | Resin BECKOPOX + $Al(OH)_3$ | 0.67% 0.92% | $3.00 \times 10^{-2}$ | 3.32 |

What is claimed is:

1. A stabilized pulverulent red phosphorus, comprising; red phosphorus particles; and an oxidation stabilizer enveloping said phosphorus particles in the form of a composite capsule, said capsule being approximately 1 to 12% by weight based upon the amount of said phosphorus particles and having a first layer of aluminum hydroxide adhering onto the surface of said phosphorus particles, the aluminum hydroxide being approximately 0.2 to 4% by weight based upon the amount of said phosphorus particles, and said capsule having a second layer, superimposed onto said first layer, said second layer having a polycondensation resin formed by urea formaldehyde modified with melamine and phenol, said resin being approximately 0.8 to 8% by weight based upon said phosphorus particles.

2. The stabilized pulverulent red phosphorus according to claim 1, wherein said composite capsule has an iron content of less than 180 ppm.

3. The stabilized pulverulent red phosphorus according to claim 1, said stabilized pulverulent red phosphorus having a particle size of less than 200 μm.

4. A process for stabilizing red phosphorus powder by encapsulating particles of said power in a composite capsule having a first layer of aluminum hydroxide and a second layer, superimposed onto said first layer, with a polycondensation resin formed by urea formaldehyde modified with melamine and phenol, said process for encapsulating said particles comprising the steps of:

(a) preparing a first dispersion in water of about 40% by weight of powder of red phosphorus;

(b) adding to said first dispersion, an aqueous solution of about 10% by weight of $Al_2(SO_4)_3.18H_2O$, the ratio, by weight, between red phosphorus and $Al_2(SO_4)_3.18H_2O$ being within the range of from 10:1 to 70:1;

(c) homogenizing the components of said first dispersion as under (a) and (b) and adjusting the pH to a value of 8 to 9 thereby causing $Al(OH)_3$ to precipitate onto the powder of red phosphorus to pre-encapsulate the powder of red phosphorus;

(d) separating the powder of red phosphorus so pre-encapsulated with $Al(OH)_3$ in step (c);

(e) washing, with water, the powder of red phosphorus encapsulated with $Al(OH)_3$;

(f) dispersing the washed encapsulated powder of red phosphorus of step (e) in water to form a second dispersion thereof of about 40% by weight;

(g) adding to said second dispersion, under stirring, an aqueous solution of about 65% by weight of a precondensed resin formed by urea formaldehyde modified with melamine and phenol;

(h) homogenizing said second dispersion at a temperature of about 80° C.;

(i) adding to the composition obtained in step (h) an aqueous solution of about 10% $NH_4Cl$, said $NH_4Cl$ being about 0.03–0.05% by weight of total solids;

(j) heating at 90°–100°, under stirring, the composition obtained in step (i) thereby achieving a suspension of encapsulated red phosphorus powder, said resin being crosslinked around said powder of red phosphorus during said heating step; and (k) dehydrating the suspension of encapsulated red phosphorus powder obtained in step (j) to thereby obtain red phosphorus powder encapsulated in a composite capsule containing a first layer of $Al(OH)_3$ adhering onto the surface of red phosphorus powder and a second layer superimposed on said first layer composed of said cross-linked resin.

5. The process according to claim 4, wherein said dehydrating step is carried out by drying in vacuo at approximately 100° C.

* * * * *